United States Patent Office 2,733,216
Patented Jan. 31, 1956

2,733,216
METHOD OF MAKING PLASTIC SCINTILLATION PHOSPHORS

Geoffrey G. Eichholz and John L. Horwood, Ottawa, Ontario, Canada, assignors to Her Majesty the Queen in the right of Canada, as represented by the Minister of Mines and Technical Surveys No Drawing. Application May 7, 1953,
Serial No. 353,668

2 Claims. (Cl. 252—301.2)

This invention relates to phosphor elements, useful in the conversion of high energy radiations to fluorescent light to act upon a photomultiplier tube, or similar light-sensitive device, in order that the amount of radiation emanating from an ore or any other radioactive source may be measured readily, and to an effective method of producing such elements.

Much is known and published about fluorescent materials and about photomultiplier tubes for converting luminous energy into electrical pulses which may be recorded. However, for the detection and measurement of high-energy radiations, such as beta and gamma radiations, there exist but a few efficient phosphor materials. The majority of such materials present definite practical drawbacks with regard to their mode of manufacture, their flexibility in use, and the size and shape in which they are available.

The object of the present invention is to provide for the manufacture of phosphor units which have uniform effective energy converting capacity per unit volume, which may be prepared in any size and shape as desired, which are relatively cheap, quickly and easily manufactured, very rugged mechanically, and very stable over a wide range of temperature and humidity conditions.

In accordance with the invention one or more hydrocarbon fluorescence-producing agents are mixed with styrene moulding powder. The mixture is placed in a moulding device, heated to a softening temperature of 85–105° C. under super-atmospheric pressure of 1000 to 2000 p. s. i., then the pressure is raised to 4000 to 20,000 p. s. i. depending on the size and shape of the mould. The temperature is then raised to a point at least above the melting point of the phosphor materials to ensure a complete solution of the styrene and all the fluorescence agents. The temperature should not be below the normal curing temperature range of the polystyrene. A temperature of 160–180° C. is sufficient for some phosphor mixtures, but in each case it should be in excess of the melting points of all the phosphor components of the mixture in order to effect uniform dissolution of the components before polymerization takes place and the solution solidifies. A high moulding temperature is advisable to overcome any temperature variations that may exist inside the mixture. Under these conditions uniform incorporation of the fluorescence agent or agents into the polystyrene is readily effected and a clear, bubble-free plastic phosphor is obtained without the use of catalysts or the introduction of any foreign material which might tend to reduce the uniform clarity of the phosphor unit or its effectiveness as a radiation detector. When the phosphor materials have formed a uniform solution the mass is allowed to cool to solid structural form and is ready for use.

Hydrocarbon compounds which may be used as fluorescence agents include many aromatic compounds such as terphenyl, fluorene, chrysene, phenanthrene, indene, anthracene, xylene, toluene, and related substances. Fluorene and terphenyl are preferred as they have been found to be most suitable for large phosphors to convert effectively the energy of incident gamma radiation into light to actuate the photomultiplier tube. Only small proportions of such compounds in relation to the polystyrene are required though the actual proportion is to some extent dependent on the type of radiation to be detected and the size of phosphor unit desired. The proportions may be within the range of 0.2 to 20% by weight of the polystyrene. Preferred proportions are of the order of 1 to 7% dependent upon the substances used. High purity of all ingredients is essential.

While the introduction of foreign material, such as a catalyst for effecting polymerization, may be objectionable, it has been found desirable to introduce in very small quantity an agent which shifts the fluorescence spectrum into the visible region. Traces of such an addition may produce a spectacular increase in the output of useful light energy. Diphenyl hexatriene in the amount of 0.002 to 0.05% of the polystyrene has been used and has proved the most effective agent for shifting the fluorescence spectrum of the phosphor. Other substances such as fluoranthene may be used but they have not been found to be as effective as diphenyl hexatriene, although it introduces a sharp absorption band below 4000 A. This restricts its use to photomultiplier tubes with a peak response well above 4000 A.

It will be apparent that during the formation of the solid solution the mass may be moulded into any desired structural form. Cylindrical form is preferred and cylinders of any desired diameter and length may be made. Other shapes can conveniently be obtained by machining the finished plastic into round or tapered forms, a feature no crystalline phosphor possesses. Short cylinders of uniform diameter may be readily assembled to provide an operating unit having the desired volume or mass to provide the energy conversion capacity required.

The phosphor element itself, when prepared as described, is a substantially clear mass which will fluoresce uniformly when irradiated. At the same time it can be prepared in volumes large enough to absorb most of the incident radiation and to convert its energy into luminous energy in the visible region of the spectrum. The practical advantages thus obtained, in comparison with those afforded by known phosphor units, will be apparent to those skilled in the art.

The following examples are illustrative of the composition of a unit according to the invention.

(1) Styrene _____ Grams
    Terphenyl _____ 50
    Diphenyl hexatriene _____ 1.6
                                                    0.01

Since terphenyl has a melting point of 212° C. the temperature of moulding this mixture should be about 220 to 230° C.

(2) Styrene _____ Grams
    Fluorene _____ 50
    Diphenyl hexatriene _____ 3
                                                    0.005

Because of the melting point of fluorene this mixture may be moulded at 160 to 180°.

We claim:

1. A method of producing phosphor units for use in the detection and measurement of penetrating radiation, such as gamma rays, which comprises forming a mixture of polystyrene moulding powder, 0.2 to 20% of its weight of a hydrocarbon fluorescence-producing material and 0.002 to 0.05% of its weight of an agent which shifts the fluorescence spectrum into the visible region, placing the mixture in a moulding zone, heating the mixture to a temperature of 85 to 105° C. under a pressure of 1000–2000 p. s. i. to expel air, raising the pressure to 4,000 to 20,000 p. s. i., and heating the mass at a temperature in excess of the melting point of the phosphor material and not lower than the normal curing temperature of the polystyrene to effect uniform distribution of the components in the polystyrene and form a uniformly clear product and cooling the mass to solidify it in the desired structural form.

2. The method defined in claim 1 wherein diphenyl hexatriene is the fluorescence spectrum shifting agent.

References Cited in the file of this patent

UNITED STATES PATENTS 2,559,219   Ludeman -------------- July 3, 1951

OTHER REFERENCES

Schorr and Torney: Article in Phys. Review, vol. 80, November 1, 1950, page 474. (Copy in Sci. Lib.)

Koski: Article in Phys. Review, vol. 82, April 15, 1951, pp. 230–232. (Copy in Sci. Lib.)

Boundy-Boyer: Styrene and its Polymers, 1952, Reinhold Pub. Co., page 1067. (Copy in Sci. Lib.)

Eichholz: Rev. of Sci. Instr., vol. 23, No. 6, page 305, June 1952. (Copy in Sci. Lib.)

Chou: Phys, Rev., vol. 87, No. 2, pp. 376, 377, July 15, 1952.